United States Patent
Lee

(10) Patent No.: US 11,430,330 B2
(45) Date of Patent: Aug. 30, 2022

(54) METHOD FOR PREDICTING TRAVEL TIME USING SPATIO-TEMPORAL MODEL AND APPARATUS THEREOF

(71) Applicant: Electronics and Telecommunications Research Institute, Daejeon (KR)

(72) Inventor: Yong-Ju Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 606 days.

(21) Appl. No.: 16/439,243

(22) Filed: Jun. 12, 2019

(65) Prior Publication Data

US 2019/0378405 A1 Dec. 12, 2019

(30) Foreign Application Priority Data

Jun. 12, 2018 (KR) .......................... 10-2018-0067707

(51) Int. Cl.
  *G08G 1/01* (2006.01)
  *G08G 1/052* (2006.01)
  *G06N 5/04* (2006.01)
  *G06N 20/00* (2019.01)

(52) U.S. Cl.
  CPC ............. *G08G 1/0129* (2013.01); *G06N 5/04* (2013.01); *G06N 20/00* (2019.01); *G08G 1/052* (2013.01)

(58) Field of Classification Search
  CPC ...... G08G 1/0129; G08G 1/052; G06N 20/00; G06N 5/04
  See application file for complete search history.

(56) References Cited

U.S. PATENT DOCUMENTS

| | | | | |
|---|---|---|---|---|
| 9,449,509 B2* | 9/2016 | Koshizen | ............... | B60W 40/04 |
| 2001/0044678 A1* | 11/2001 | Ito | .......................... | G01C 21/26 |
| | | | | 701/1 |
| 2005/0137800 A1* | 6/2005 | Hong | ...................... | G01S 19/47 |
| | | | | 701/472 |
| 2010/0161205 A1 | 6/2010 | Kim et al. | | |
| 2012/0253648 A1 | 10/2012 | Kim et al. | | |
| 2013/0110392 A1* | 5/2013 | Kosseifi | ............. | G01C 21/3415 |
| | | | | 701/410 |

FOREIGN PATENT DOCUMENTS

| | | |
|---|---|---|
| EP | 2950293 A2 | 12/2015 |
| KR | 101742042 B1 | 5/2017 |
| KR | 101805846 B1 | 12/2017 |

* cited by examiner

*Primary Examiner* — Ramsey Refai
(74) *Attorney, Agent, or Firm* — Rabin & Berdo, P.C.

(57) ABSTRACT

According to the present invention, a method for a travel time predicting apparatus to predict a travel time by using a travel time prediction model, including generating a first prediction model for prediction of a travel time of a vehicle that will pass through a specific area by using first traffic data that are related to a travel speed at the specific area; generating a second prediction model by modifying the first prediction model that relates to the travel speed at the specific area and is different from the first traffic data; and predicting a travel time of the vehicle that will pass through the specific area by using the second prediction model can be provided so that a travel time at which a specific vehicle passes a specific area can be more precisely predicted compared to a conventional art and predicted travel time information can be promptly and precisely provided to the user.

16 Claims, 12 Drawing Sheets

METHOD FOR PREDICTING TRAVEL TIME USING SPATIO-TEMPORAL MODEL AND APPARATUS THEREOF

CROSS-REFERENCE TO RELATED APPLICATION

This application claims priority to and the benefit of Korean Patent Application No. 10-2018-0067707 filed in the Korean Intellectual Property Office on Jun. 12, 2018, the entire contents of which are incorporated herein by reference.

BACKGROUND OF THE INVENTION

(a) Field of the Invention

An exemplary embodiment of the present invention relates to an apparatus for predicting a traveling time of a vehicle, and a method thereof.

(b) Description of the Related Art

Recently, various traffic information that provides traffic section information, congestion visibility information, and the like has been provided to users in a complex urban environment. Users can reduce running time of a vehicle and minimize cost for running the vehicle through the traffic information providing service.

As described, through the service that provides traffic information to users, traffic density in the city is dispersed so as to increase efficiency of road use. In particular, a prediction system for predicting vehicle flow on a specific route has been continuously developed and operated.

A conventional traveling time prediction system uses various types of data such as detector data, locus data of a probe vehicle, traffic data using CCTV, and the like. However, an actual travel time of a vehicle is affected not only by intersections of the city and a signal system but also by a temporal characteristic that changes with time in the corresponding space and a spatial characteristic that changes with places/spaces. Thus, a prediction system that fully reflects temporal characteristics and spatial characteristics that vary in real time is required.

For example, an existing travel time prediction method collects statistical data of past temporal characteristics, that is, traffic variation according to time variation at a past time point, and statistically predicts a travel time of a current time point by reflecting the past statistical data. However, the existing travel time prediction method cannot reflect all the variables that change in real time at a present prediction time point.

Therefore, there is a need for a travel time prediction system that utilizes a recursive travel time prediction model to more accurately predict the actual vehicle speed at the present time, in addition to the temporal characteristics of the past.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a method and an apparatus for predicting a more accurate travel time than in the past using temporal/spatial data reflecting various temporal/spatial characteristics.

A method for a travel time predicting apparatus to predict a travel time by using a travel time prediction model according to an exemplary embodiment of the present invention, includes: generating a first prediction model for prediction of a travel time of a vehicle that will pass through a specific area by using first traffic data that are related to a travel speed at the specific area; generating a second prediction model by modifying the first prediction model that relates to the travel speed at the specific area and is different from the first traffic data; and predicting a travel time of the vehicle that will pass through the specific area by using the second prediction model.

The second traffic data may have a larger amount of variation over time than the first traffic data.

The first traffic data may include a travel speed history of vehicles having passed through the specific area.

The first traffic data may include weather information of the specific area

The method for the travel time predicting apparatus to predict the travel time by using the travel time prediction model may further include: generating a third prediction model by modifying the second prediction model with third traffic data, which is related to a travel speed at the specific area and has a larger amount of variation over time than the first traffic data and the second traffic data; and predicting the travel time by using the third prediction model.

The third traffic data may include time zone information.

The method for the travel time predicting apparatus to predict the travel time by using the travel time prediction model may further include: generating a fourth prediction model by modifying the third prediction model with fourth traffic data, which is related to a travel speed at the specific area and has a larger amount of variation over time than the first traffic data, the second traffic data, and the third traffic data; and predicting the travel time by using the fourth prediction model.

The fourth traffic data may include variation information of a traffic amount over time of the specific area.

A travel time predicting apparatus according to an exemplary embodiment of the present invention includes: a data collection portion that collects first traffic data that is related to a travel speed at a specific area, and second traffic data that is different from the first traffic data and related to the travel speed at the specific area; a travel time training portion that generates a first prediction model for prediction of a travel time of a vehicle that will pass through the specific area by using the first traffic data, and a second prediction mode by modifying the first prediction model with the second traffic data; and a travel time prediction portion that predicts a travel time of a vehicle that will pass through the specific area by using the second prediction model.

The second traffic data may have a larger amount of variation over time than the first traffic data.

The first traffic data may include a travel speed history of vehicles having passed through the specific area.

The first traffic data may include weather information of the specific area.

the data collection portion may collect third traffic data related to a travel speed at the specific area and having a larger amount of variation over time than the first traffic data and the second traffic data, the travel time training portion may generate a third prediction model by modifying the second prediction model with the third traffic data, and the travel time prediction portion may predict the travel time by using the third prediction model.

The third traffic data may include time zone information.

the data collection portion may collect fourth traffic data related to a travel speed at the specific area and having a larger amount of variation over time than the first traffic data, the second traffic data, and the third traffic data, the travel time training portion may generate a fourth prediction model by modifying the third prediction model with the fourth traffic data, and the travel time prediction portion may predict the travel time by using the fourth prediction model.

The fourth traffic data may include variation information of a traffic amount over time at the specific area.

According to the exemplary embodiments of the present invention, when a travel time is predicted and provided to a user, temporal/spatial data used for travel time prediction are fully reflected so more precisely predict a travel time at which a specific vehicle passes a specific area compared to a conventional art, and predicted travel time information can be promptly and precisely provided to the user.

DETAILED DESCRIPTION OF THE EMBODIMENTS

Figure 1:
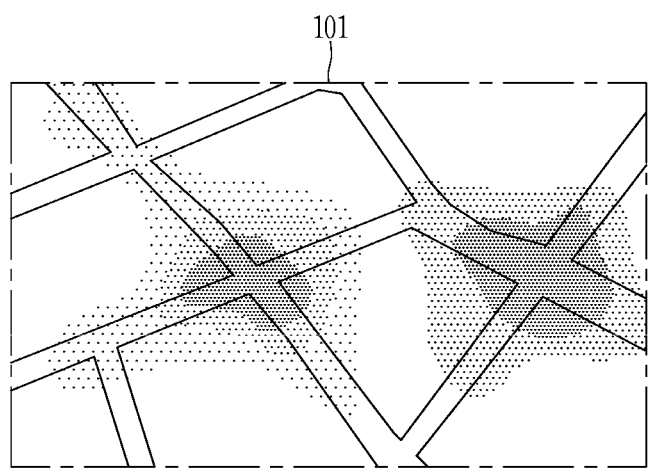
FIG. 1 shows congestion data according to an exemplary embodiment of the present invention.
Figure 1:
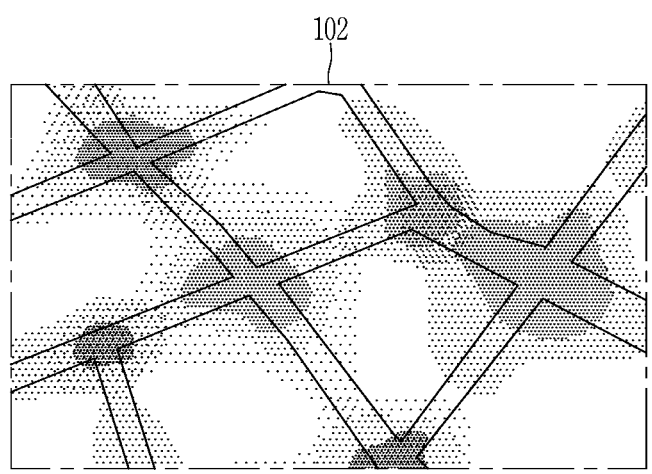

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

FIG. 1 shows congestion data according to an exemplary embodiment of the present invention.

As shown in FIG. 1, congestion data according to the exemplary embodiment of the present invention includes first congestion information 101 at a first time in a specific area and second congestion information 102 at a second time in the same specific area. The degree of congestion of a road is a relative value that changes according to time.

For example, in the specific area, the second time may have a higher degree of congestion of the road than that of the first time. The degree of road congestion in the specific area indicated in the second congestion information 102, may indicate a higher level of congestion than the degree of road congestion in the specific area indicated in the first congestion information 101.

The first congestion information 101 and the second congestion information 102 may include various congestion factors such as average commuting time of workers working in a city in a specific area, an event scheduled to occur in the city in the specific area, and an unexpected situation occurring in the center in the specific area, and the like. As shown in the first congestion information 101 and the second congestion information 102, the intersections and the vicinity of the intersections (for example, roads whose actual distances are within 2 km from the intersection) among the city roads in the specific area are more congested than other roads in the specific area.

Figure 2:
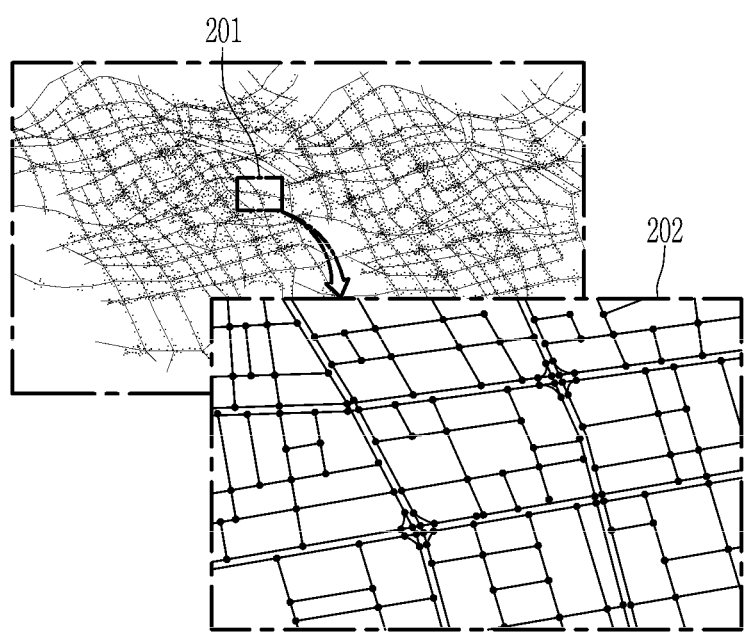
FIG. 2 shows intersections according to the exemplary embodiment of the present invention.

FIG. 2 shows intersections according to the exemplary embodiment of the present invention.

A specific area 201 includes intersections and roads, and the intersections and roads may be connected through nodes and links. The node may indicate a specific spot including an intersection. The link may be formed of lines that connect two nodes, and may imply a road where a vehicle can be driven.

The traveling time prediction apparatus according to the exemplary embodiment of the present invention may provide various forms of traffic information, centering on the nodes. The traffic information may include, for example, traffic density information that indicates an amount of vehicles on the road, and traveling time information.

Figure 3:
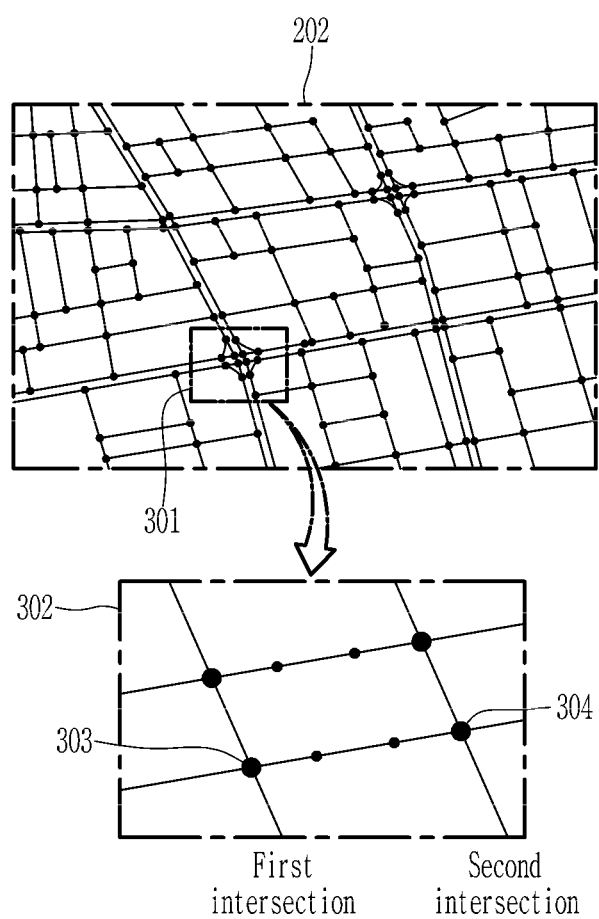
FIG. 3 shows a method for calculating traveling time between intersections according to the exemplary embodiment of the present invention.

FIG. 3 shows a method for calculating travel time between intersections according to the exemplary embodiment of the present invention.

As shown in FIG. 3, in a large-scaled map of a specific area 301, time taken for a specific vehicle to travel between a first intersection 303 and a second intersection 304 included in a small area 302 in the specific area may be calculated from a difference of a first time at which the specific vehicle passes the first intersection 302 and a second time at which the specific vehicles passes the second intersection 303. A distance between the first intersection 302 and the second intersection 303 may be a difference (displacement) of a location of each of the two intersections.

A vehicle speed $XY_{(km/h)}$ of the vehicle passing through the second intersection 303 from the first intersection 302 may be represented as given in Equation 1.

$$XY_{km/h} = XY_{ba}/T_{ba} * 3.6 \tag{Equation 1}$$

($T_{ba}$ denotes a passage time s between two intersections and $XY_{ba}$ denotes a distance m between two intersections)

Accordingly, a travel speed of a vehicle that will pass two intersections 302 and 303 can be predicted by using an average travel time of the vehicle that passes the first intersection 302 and the second intersection 303 and a distance between the two intersections.

In addition, a travel time of a vehicle that will pass two intersections 302 and 303 can be predicted by using an average travel speed of the vehicle that passes the first intersection 302 and the second intersection 303 and a distance between the two intersections, and a travel time of the specific vehicle with respect to the entire driving route that includes a section between the first intersection 302 and the second intersection 303 can be predicted by using the predicted travel time.

Figure 4:
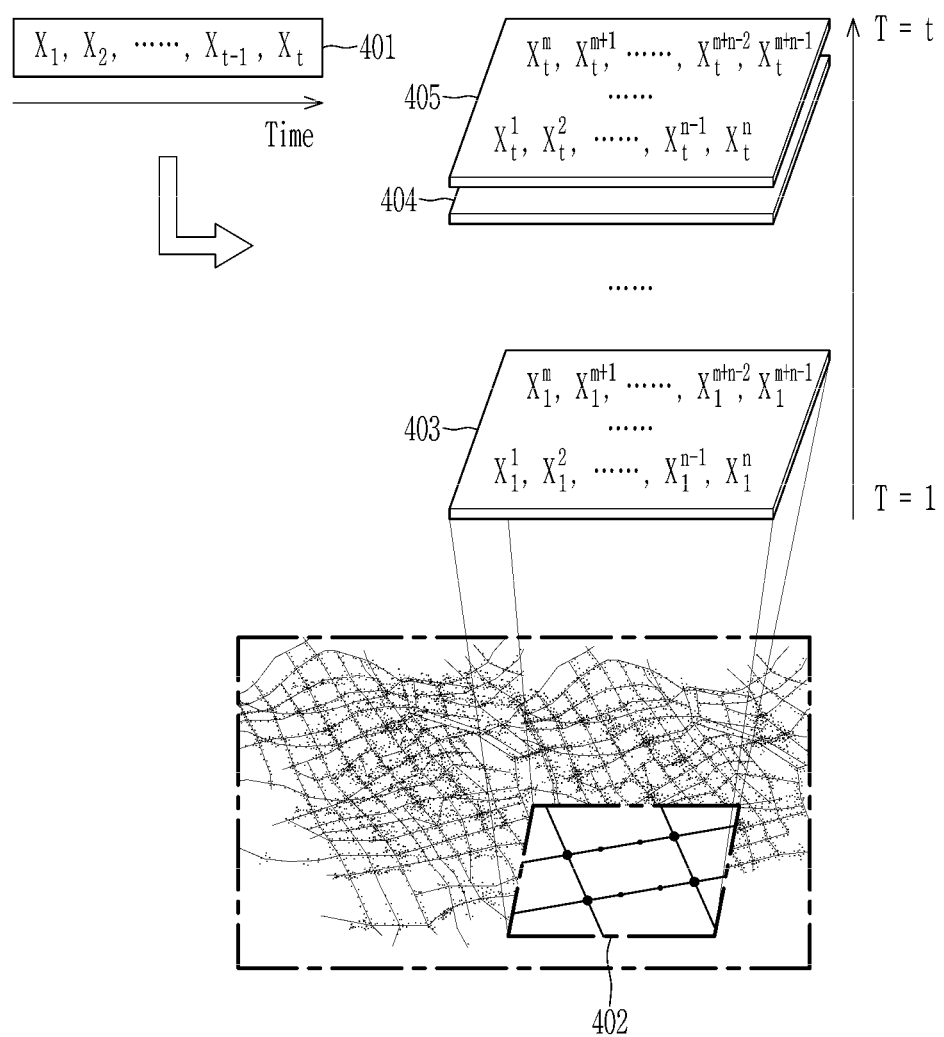
FIG. 4 shows a traveling speed matrix according to time change per intersection according to the exemplary embodiment of the present invention.

FIG. 4 shows a travel speed matrix according to time change per intersection according to the exemplary embodiment of the present invention.

As shown in FIG. 4, travel speed data $X_1, X_2, \ldots, X_{t-1}$, and $X_t$ 401 are history data that record travel speeds of vehicles having traveled the respective intersections when time T is t=1, 2, ..., t−1, and t.

When a current time T=t, travel speed matrices 403, 404, and 405 may include a first travel time matrix 403 of intersections in a specific area, recorded at T=1, a second travel time matrix 404 of intersections recorded at T=t−1, and an N-th travel time matrix 405 of intersections, recorded at T=t.

The travel time prediction apparatus may generate a plurality of travel speed history matrices with respect to various intersections, collected according to time flow with reference to a specific area 402 on the map, and may predict a travel speed of a specific vehicle passing between specific intersections at a specific time by using the plurality of travel time matrixes 403 to 405.

Figure 5:
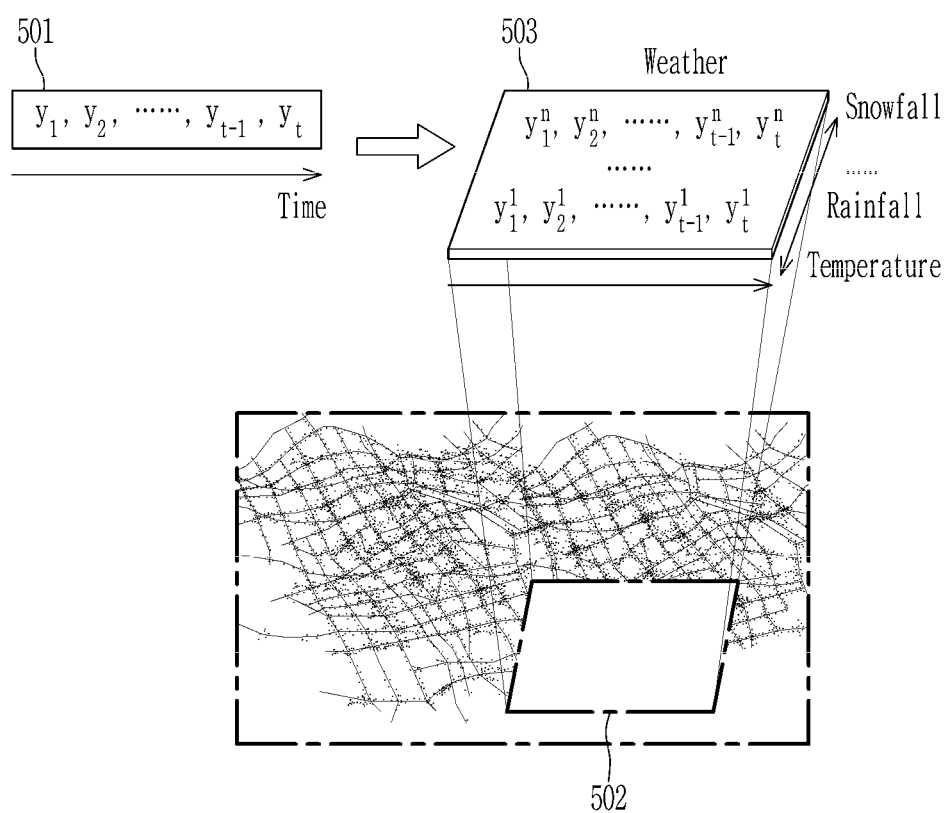
FIG. 5 shows weather data according to time change in a specific area according to the exemplary embodiment of the present invention.

FIG. 5 shows weather data according to a time change in a specific area according to the exemplary embodiment of the present invention.

As shown in FIG. 5, weather data 501 may include information on types of weather of a specific area 502 that includes cities, districts, or towns.

A weather history matrix 503 may include information on weather types (temperature, precipitation, snowfall, and the like) in the specific area 502, varied form T=1 to T=t.

Figure 6:
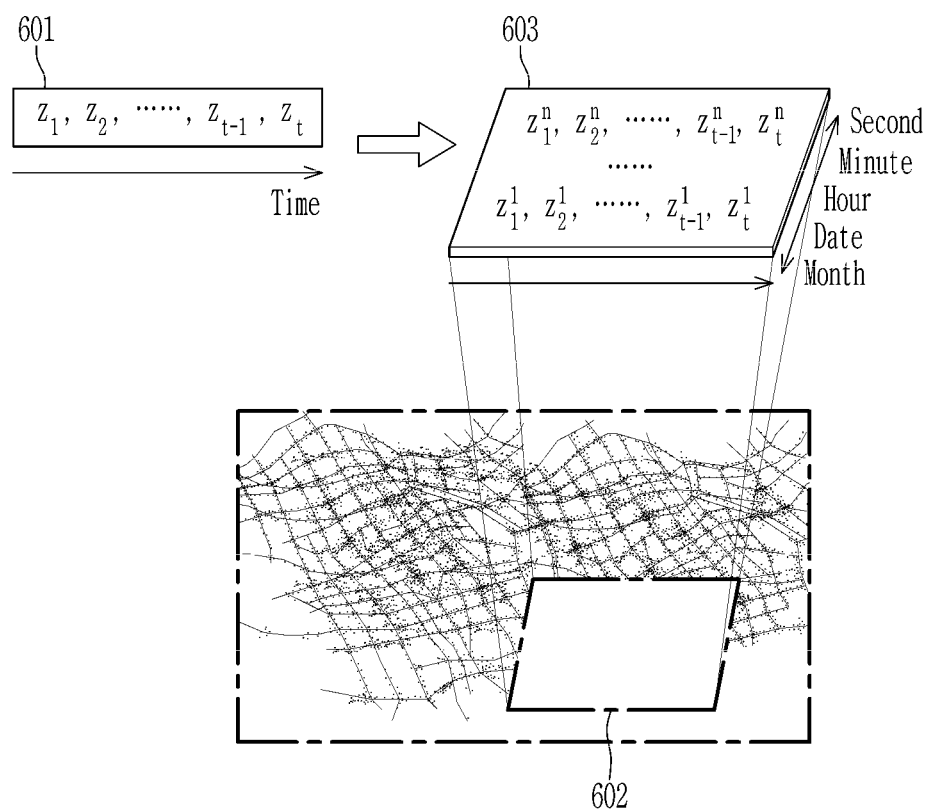
FIG. 6 shows a time zone matrix according to the exemplary embodiment of the present invention.

FIG. 6 shows a time zone matrix according to the exemplary embodiment of the present invention.

As shown in FIG. 6, time zone data 601 indicates a time zone value (e.g., a day, a minute, an hour, a date, a month) according to a time change in a specific area.

A time zone matrix 603 may indicate a time zone value (e.g., a day, a minute, an hour, a date, a month) according to a time change 601 in a specific area 602. The time zone matrix 603 may be represented as one time zone value (e.g., Monday) in a case of the same time zone (i.e., T is the same).

Figure 7:
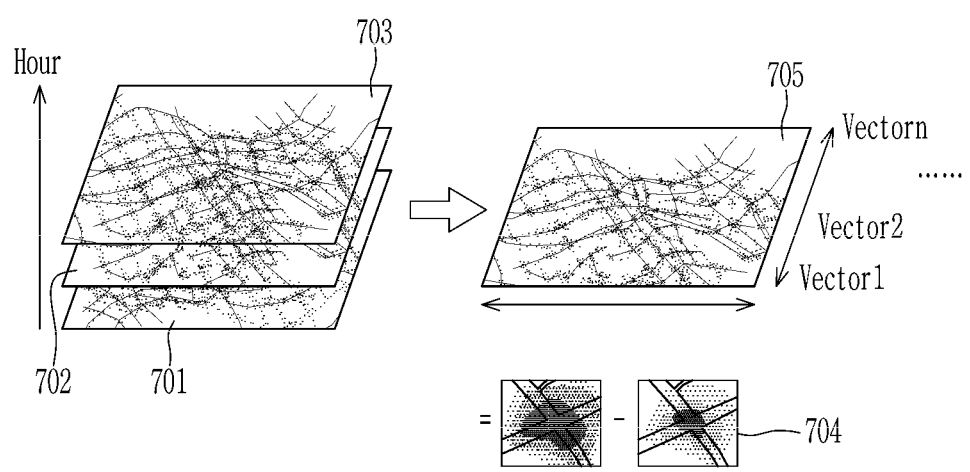
FIG. 7 shows a heatmap that indicates the degree of congestion according to the exemplary embodiment of the present invention.

FIG. 7 shows a heatmap that indicates the degree of congestion according to the exemplary embodiment of the present invention.

As shown in FIG. 7, heatmap data 701, 702, and 703 may show the degree of congestion on the road on the map in stages at a specific time T in the specific area.

The heatmap data 701, 702, and 703 include not only information on traffic flow of specific intersections but also information on traffic flow of the entire city.

A heatmap matrix 705 may show the amount of variation of the degree of congestion between a plurality of heatmap data 701 and 703 in the form of a vector. That is, the heatmap matrix 705 may show a variation amount between first heatmap data 701 at a first time and second heatmap data 720 at a second time and a variation amount between the second heatmap data 702 and third heatmap data 703 at a third time in the form of vectors.

Figure 8:
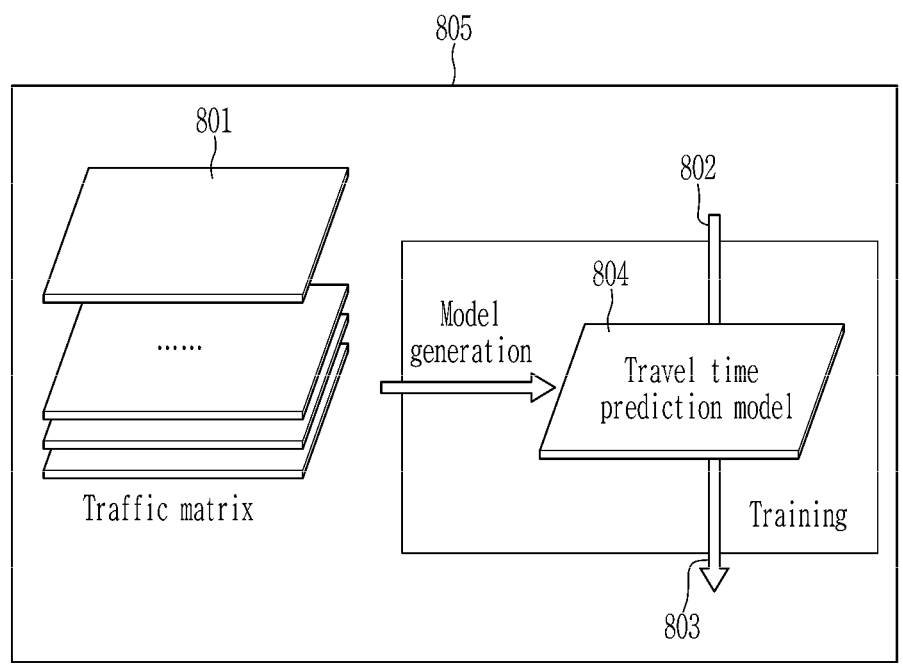
FIG. 8 shows a process for generating an integrated traffic data set according to the exemplary embodiment of the present invention.

FIG. 8 shows a process for generating an integrated traffic data set according to the exemplary embodiment of the present invention.

A traffic time prediction apparatus 805 collects a plurality of traffic matrices, which were described with reference to FIG. 4 to FIG. 7, integrates the collected plurality of traffic matrices as a single integrated traffic data set 801, and generates a travel time prediction model by using the integrated traffic data set 801.

After the travel time prediction model is initially generated, the travel time prediction apparatus 805 inputs new input data as a travel time prediction model, and trains a travel time prediction model 804 by using output data 803 output from the travel time prediction model based on input data 802. That is, the travel time prediction apparatus 805 can continuously modify a plurality of coefficients of the travel time prediction model by using a plurality of input data 802 and a plurality of output data 803 based on the input data 802. That is, the travel time prediction apparatus 805 generates the travel time prediction model 804 including the plurality of coefficients, and then continuously receives input data and modifies the generated plurality of coefficients of the travel time prediction model 804 by using output data output according to the input data.

Figure 9:
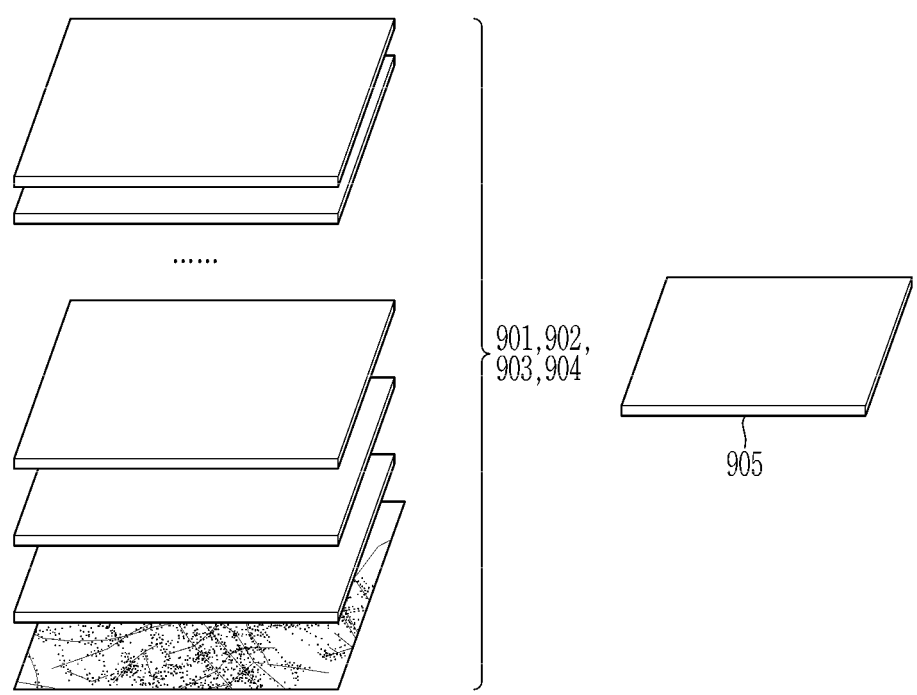
FIG. 9 shows a simple merger model according to the exemplary embodiment of the present invention.

FIG. 9 shows a simple merger model according to the exemplary embodiment of the present invention.

As shown in FIG. 9, when training with respect to the travel time prediction model described with reference to FIG. 8 is carried out, the travel time prediction apparatus can output a travel time prediction result by using the travel time prediction model.

For example, the travel time prediction apparatus determines a coefficient of the travel time prediction model 905 by integrating a travel speed matrix 901, a weather matrix 902, a time zone matrix 903, and a congestion heatmap matrix 904, modifies and outputs the coefficient by using input data and output data, and predicts a travel time by using the modified travel time prediction model 905.

Figure 10:
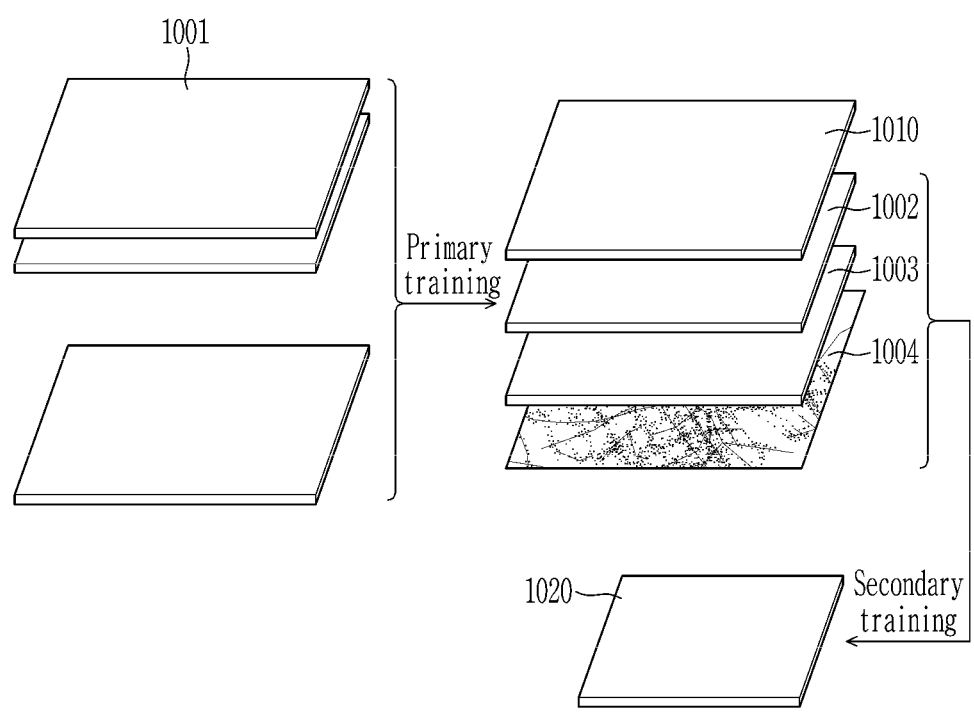
FIG. 10 shows a method for generating a travel time prediction model according to the exemplary embodiment of the present invention.

FIG. 10 shows a method for generating a travel time prediction model according to the exemplary embodiment of the present invention.

As shown in FIG. 10, the travel time prediction apparatus generates an initial travel time prediction model 1010 by using a part of matrices (e.g., a traffic time matrix 1001), excluding matrices (e.g., the weather matrix, the time zone matrix, the congestion heatmap matrix) which are frequently modified according to a traffic flow among the traffic matrices shown in FIG. 4 to FIG. 7 through primary training, and then generates a final travel time prediction model 1020 that is modified by using a part of the rest of the matrices (e.g., the weather matrix, the time zone matrix, the congestion heatmap matrix) 1002, 1003, and 1004 through secondary training.

Figure 11:
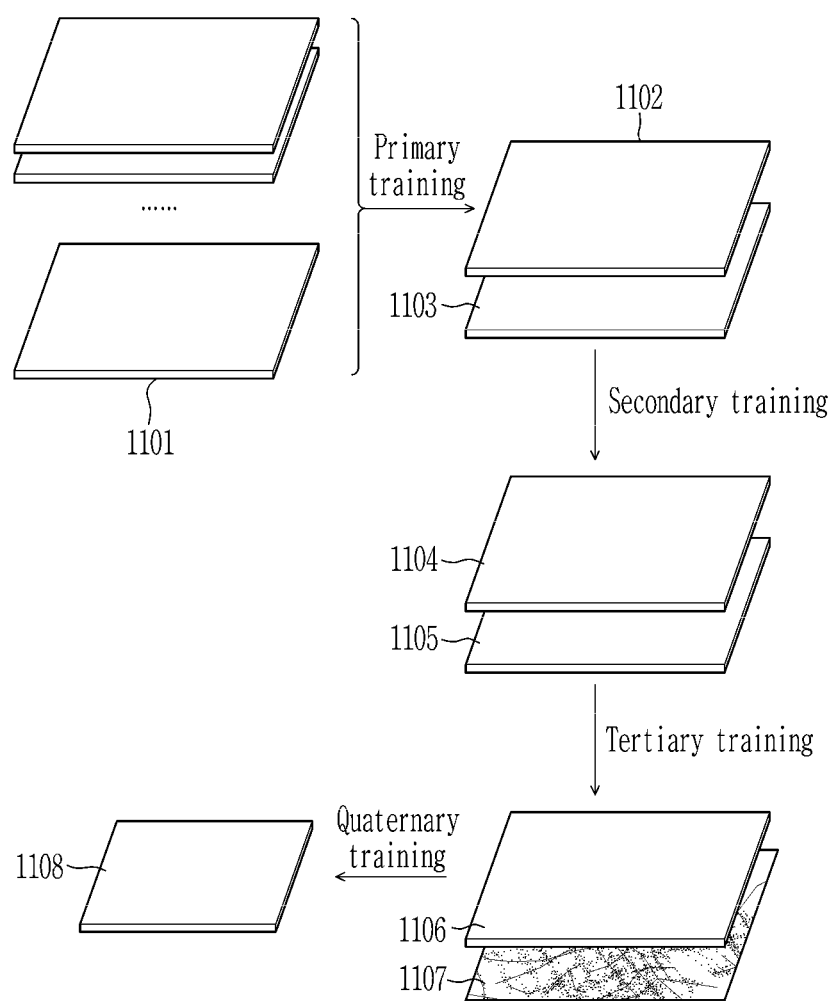
FIG. 11 shows a process for generation of a travel time prediction model according to another exemplary embodiment of the present invention.

FIG. 11 shows a process for generation of a travel time prediction model according to another exemplary embodiment of the present invention.

As shown in FIG. 11, a travel time prediction apparatus may carry out training with respect to a travel time prediction model by using a plurality of matrices sequentially from a matrix having a small variation to a matrix having a large variation according to a traffic flow.

For example, the travel time prediction apparatus generates a first travel time prediction model 1102 based on a travel speed matrix 1101 through primary training, generates a second travel time prediction model 1104 primarily modified from the first travel time prediction model 1102 based on a weather matrix 1103 through secondary training, generates a third travel time prediction model 1106, modified from the second travel time prediction model 1104 by using a time zone matrix 1105 through tertiary training, and generates a final travel time prediction model 1108, modified from the third travel time prediction model 1106 by using a congestion heatmap matrix 1107 through quaternary training.

Figure 12:
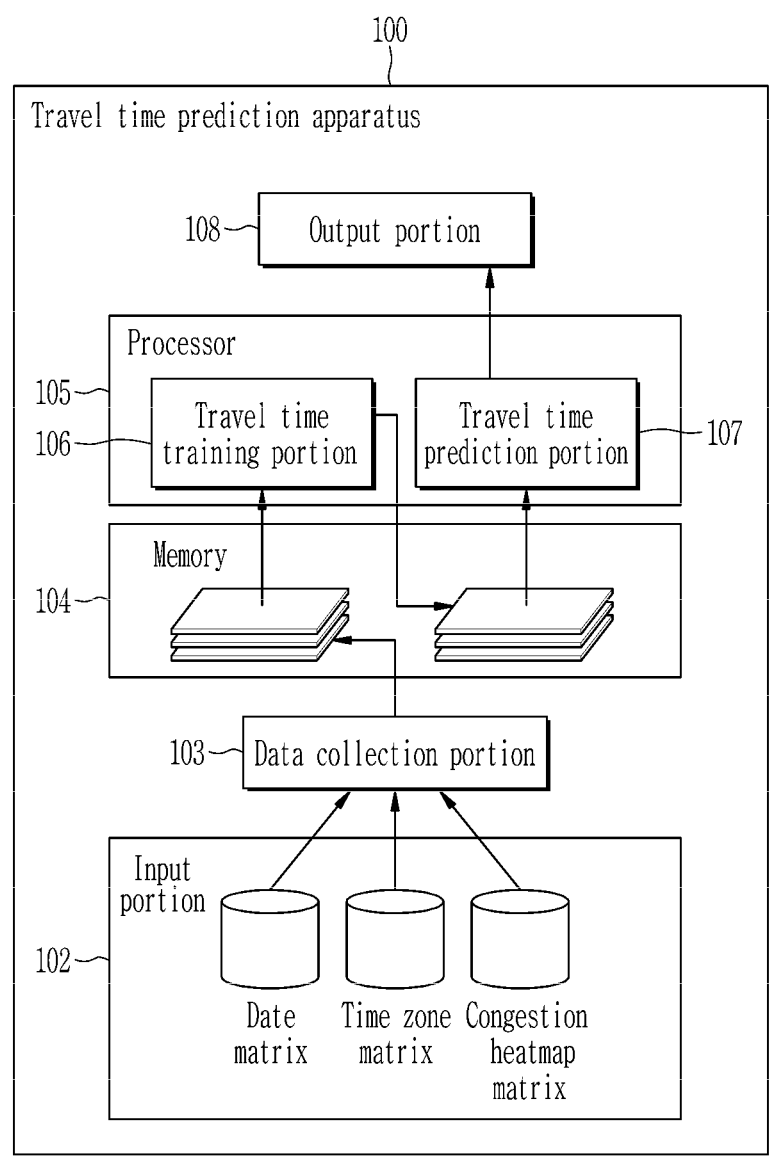
FIG. 12 shows a travel time prediction apparatus according to the present exemplary embodiment.

FIG. 12 shows a travel time prediction apparatus according to the present exemplary embodiment.

As shown in FIG. 12, a travel time prediction apparatus 100 according to the present exemplary embodiment includes an input portion 102, a data collection portion 103, a memory 104, a processor 105, and an output portion 108.

The input portion 102 receives a travel time matrix, a weather matrix, a time zone matrix, and a congestion heatmap matrix through a user's input from the outside or by using data exchange with an external communication device.

The data collection portion 103 collects the travel time matrix, the weather matrix, the time zone matrix, and the congestion heatmap matrix received through the input portion 102 and stores the collected matrices in the memory 104.

The memory 104 includes a storage space for storing the travel time matrix, the weather matrix, the time zone matrix, and the congestion heatmap matrix collected through the data collection portion 103.

The processor 105 may include a travel time training portion 106 that carries out training described with reference to FIG. 1 to FIG. 11 by acquiring the travel time matrix, the weather matrix, the time zone matrix, and the congestion heatmap matrix stored in the memory 104, and a travel time prediction portion 107 that predicts a travel time by using a travel time prediction model trained by the travel time training portion 106.

The output portion 108 outputs travel time prediction data generated through the processor 105 to the outside.

While this invention has been described in connection with what is presently considered to be practical exemplary embodiments, it is to be understood that the invention is not limited to the disclosed embodiments. On the contrary, it is intended to cover various modifications and equivalent arrangements included within the spirit and scope of the appended claims.

What is claimed is:

1. A method for a travel time predicting apparatus to predict a travel time by using a travel time prediction model, comprising:
generating a first prediction model for prediction of a travel time of a vehicle that will pass through a specific area by using first traffic data that are related to a travel speed at the specific area;
generating a second prediction model by modifying the first prediction model with second traffic data that relates to the travel speed at the specific area and is different from the first traffic data; and
predicting a travel time of the vehicle that will pass through the specific area by using the second prediction model;
wherein the generating the first prediction model includes generating a travel speed history matrix with respect to various intersections, collected according to time flow with reference to the specific area, and integrating a plurality of traffic matrices including the travel speed history matrix as a single integrated traffic data set; and
wherein the generating the second prediction model includes inputting new data to the first prediction model to train the first prediction model and outputting data from the first prediction model, and
continuously modifying coefficients of the first prediction model using the input new data and the output data.

2. The method for the travel time predicting apparatus to predict the travel time by using the travel time prediction model of claim 1, wherein the second traffic data has a larger amount of variation over time than the first traffic data.

3. The method for the travel time predicting apparatus to predict the travel time by using the travel time prediction model of claim 2, wherein the first traffic data comprises a travel speed history of vehicles having passed through the specific area.

4. The method for the travel time predicting apparatus to predict the travel time by using the travel time prediction model of claim 3, wherein the first traffic data comprises weather information of the specific area.

5. The method for the travel time predicting apparatus to predict the travel time by using the travel time prediction model of claim 4, further comprising:
generating a third prediction model by modifying the second prediction model with third traffic data, which is related to a travel speed at the specific area and has a larger amount of variation over time than the first traffic data and the second traffic data; and
predicting the travel time by using the third prediction model.

6. The method for the travel time predicting apparatus to predict the travel time by using the travel time prediction model of claim 5, wherein the third traffic data comprises time zone information.

7. The method for the travel time predicting apparatus to predict the travel time by using the travel time prediction model of claim 6, further comprising:
generating a fourth prediction model by modifying the third prediction model with fourth traffic data, which is related to a travel speed at the specific area and has a larger amount of variation over time than the first traffic data, the second traffic data, and the third traffic data; and
predicting the travel time by using the fourth prediction model.

8. The method for the travel time predicting apparatus to predict the travel time by using the travel time prediction model of claim 7, wherein the fourth traffic data comprises variation information of a traffic amount over time of the specific area.

9. A travel time predicting apparatus comprising:
a data collection portion that collects first traffic data that is related to a travel speed at a specific area, and second traffic data that is different from the first traffic data and related to the travel speed at the specific area;
a travel time training portion that generates a first prediction model for prediction of a travel time of a vehicle that will pass through the specific area by using the first traffic data, and a second prediction model by modifying the first prediction model with the second traffic data; and
a travel time prediction portion that predicts a travel time of a vehicle that will pass through the specific area by using the second prediction model;
wherein the travel time training portion generates the first prediction model by operations including generating a travel speed history matrix with respect to various intersections, collected according to time flow with reference to the specific area, and integrating a plurality of traffic matrices including the travel speed history matrix as a single integrated traffic data set; and wherein the travel time training portion generates the second prediction model by operations including inputting new data to the first prediction model to train the first prediction model and outputting data from the first prediction model, and continuously modifying coefficients of the first prediction model using the input new data and the output data.

10. The travel time predicting apparatus of claim 9, wherein the second traffic data has a larger amount of variation over time than the first traffic data.

11. The travel time predicting apparatus of claim 10, wherein the first traffic data comprises a travel speed history of vehicles having passed through the specific area.

12. The travel time predicting apparatus of claim 11, wherein the first traffic data comprises weather information of the specific area.

13. The travel time predicting apparatus of claim 12, wherein the data collection portion collects third traffic data related to a travel speed at the specific area and having a larger amount of variation over time than the first traffic data and the second traffic data, the travel time training portion generates a third prediction model by modifying the second prediction model with the third traffic data, and the travel time prediction portion predicts the travel time by using the third prediction model.

14. The travel time predicting apparatus of claim 13, wherein the third traffic data comprises time zone information.

15. The travel time predicting apparatus of claim 14, wherein the data collection portion collects fourth traffic data related to a travel speed at the specific area and having a larger amount of variation over time than the first traffic data, the second traffic data, and the third traffic data, the travel time training portion generates a fourth prediction model by modifying the third prediction model with the fourth traffic data, and the travel time prediction portion predicts the travel time by using the fourth prediction model.

16. The travel time predicting apparatus of claim 15, wherein the fourth traffic data comprises variation information of a traffic amount over time at the specific area.

* * * * *